United States Patent
Patil

(10) Patent No.: US 11,183,844 B2
(45) Date of Patent: Nov. 23, 2021

(54) SUPPLYING ENERGY TO AN APPARATUS

(71) Applicant: Arm Limited, Cambridge (GB)

(72) Inventor: Sanjay B. Patil, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/008,393

(22) Filed: Jun. 14, 2018

(65) Prior Publication Data

US 2019/0386489 A1  Dec. 19, 2019

(51) Int. Cl.
| | |
|---|---|
| G05F 1/652 | (2006.01) |
| H02J 3/28 | (2006.01) |
| G05F 1/445 | (2006.01) |
| G05F 1/66 | (2006.01) |

(52) U.S. Cl.
CPC .............. H02J 3/28 (2013.01); G05F 1/445 (2013.01); G05F 1/652 (2013.01); G05F 1/66 (2013.01)

(58) Field of Classification Search
CPC .............................................. H02J 7/0031–32
See application file for complete search history.

(56) References Cited

U.S. PATENT DOCUMENTS

| | | | | |
|---|---|---|---|---|
| 5,666,006 | A * | 9/1997 | Townsley | H02J 7/0024 307/43 |
| 9,785,177 | B1 * | 10/2017 | Coimbra | G05F 3/16 |
| 2007/0057698 | A1 | 3/2007 | Verbauwhede et al. | |
| 2010/0059353 | A1 * | 3/2010 | Bastholm | H01H 9/182 200/5 A |
| 2010/0072759 | A1 * | 3/2010 | Andosca | H01L 41/1136 290/1 R |
| 2010/0194205 | A1 * | 8/2010 | Tokunaga | G06F 21/556 307/100 |
| 2011/0047052 | A1 * | 2/2011 | Cornish | B60L 11/1861 705/30 |
| 2011/0205678 | A1 * | 8/2011 | Baba | H02J 7/0031 361/86 |
| 2012/0153910 | A1 * | 6/2012 | Bulzacchelli | G05F 1/575 323/272 |
| 2014/0167837 | A1 | 6/2014 | Yannette et al. | |
| 2014/0268463 | A1 * | 9/2014 | Dreps | H03K 17/04 361/91.1 |
| 2019/0007223 | A1 | 1/2019 | Vaidya | |

FOREIGN PATENT DOCUMENTS

EP    1 113 386    7/2001

OTHER PUBLICATIONS

International Search Report and Written Opinion of the International Searching Authority for PCT/GB2019/051288 dated Jul. 2, 2019 (received Jun. 27, 2019), 15 pages.

(Continued)

*Primary Examiner* — Peter M Novak
(74) *Attorney, Agent, or Firm* — Nixon & Vanderhye P.C.

(57) ABSTRACT

An apparatus is provided, which includes energy storage circuitry to store energy and to supply some of the energy to the apparatus. Discharge circuitry discharges the energy storage circuitry in response to the energy being supplied to the apparatus. Power supply circuitry recharges the energy storage circuitry. The discharge circuitry retains a non-zero residual energy in the energy storage circuitry when the energy storage circuitry is discharged by the discharge circuitry.

12 Claims, 11 Drawing Sheets

(56) References Cited

OTHER PUBLICATIONS

Byong-Deok Choi et al, "Symmetric Adiabatic Logic Circuits against Differential Power Analysis" ETRI Journal, vol. 32, No. 1, Feb. 2010, pp. 166-168.
Adi Shamir, "Protecting Smart Cards from Passive Power Analysis with Detached Power Supplies" 2000 Proceedings $2^{nd}$ International Workshop Cryptographic Hardware and Embedded Systems, vol. 1965, Aug. 17, 2000, pp. 71-77.
International Search Report and Written Opinion of the International Searching Authority dated Jul. 26, 2019 in PCT/GB2019/051286, 14 pages.
Office Action dated Feb. 7, 2020 for U.S. Appl. No. 16/008,345, 11 pages.
Office Action dated Aug. 24, 2020 for U.S. Appl. No. 16/008,345, 11 pages.
Office Action dated Mar. 19, 2021 for U.S. Appl. No. 16/008,345, 13 pages.

\* cited by examiner

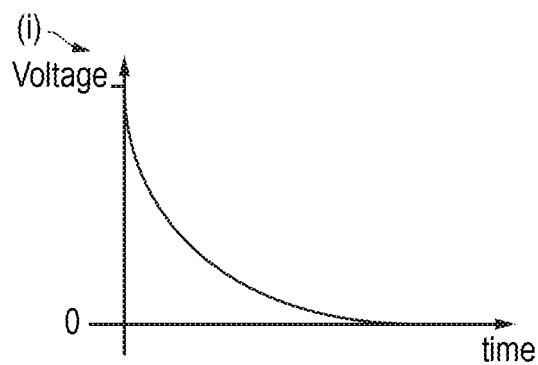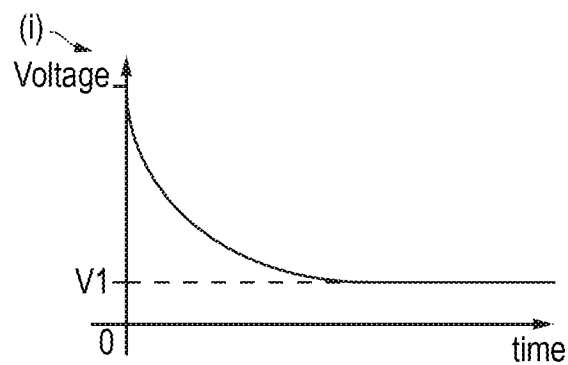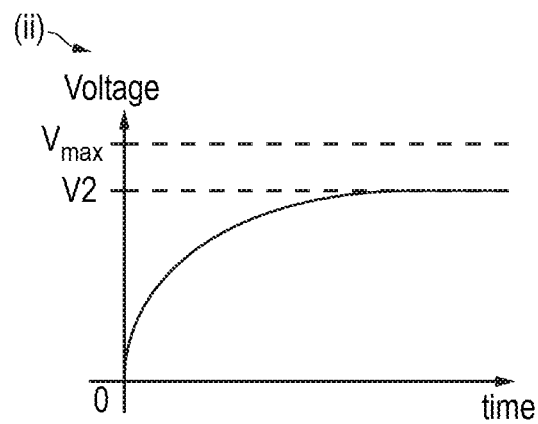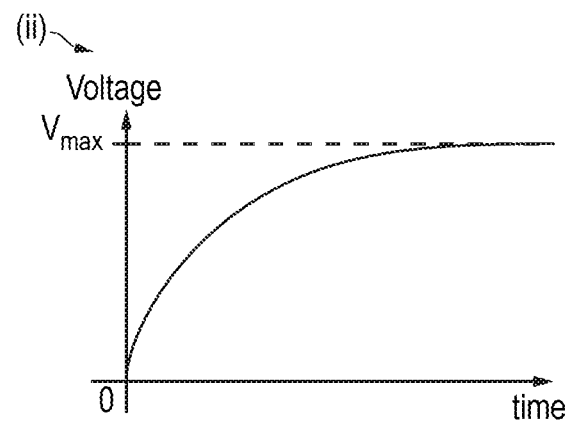
FIG. 4A         FIG. 4B

SUPPLYING ENERGY TO AN APPARATUS

TECHNICAL FIELD

The present disclosure relates to energy. In particular, the present technique has relevance to supplying energy to an apparatus.

DESCRIPTION

It is common in various apparatuses, such as data processing apparatuses to charge a capacitor, which then provides small amounts of energy to processing circuitry. The remaining charge on the capacitor is then discharged, before the capacitor is charged up once again. This process means that the processing circuitry is not directly powered by, e.g. a mains power supply.

SUMMARY

Viewed from a first example configuration, there is provided an apparatus comprising energy storage circuitry to store energy and to supply some of the energy to the apparatus; discharge circuitry to discharge the energy storage circuitry in response to the some of the energy being supplied to the apparatus; and power supply circuitry to recharge the energy storage circuitry, wherein the discharge circuitry is adapted to retain a non-zero residual energy in the energy storage circuitry when the energy storage circuitry is discharged by the discharge circuitry.

Viewed from a second example configuration, there is provided a method comprising: storing energy in energy storage circuitry; supplying some of the energy to an apparatus; discharging the energy in response to the some of the energy being supplied to the apparatus; retaining a non-zero residual energy; and recharging the energy storage circuitry.

Viewed from a third example configuration, there is provided an apparatus comprising: means for storing energy; means for supplying some of the energy to an apparatus; means for discharging the energy in response to the some of the energy being supplied to the apparatus; means for retaining a non-zero residual energy; and means for recharging the means for storing energy.

BRIEF DESCRIPTION OF THE DRAWINGS

The present invention will be described further, by way of example only, with reference to embodiments thereof as illustrated in the accompanying drawings, in which:

FIGS. 4A and 4B illustrate voltage over time graphs for a circuit element;

DESCRIPTION OF EXAMPLE EMBODIMENTS

Figure 1:
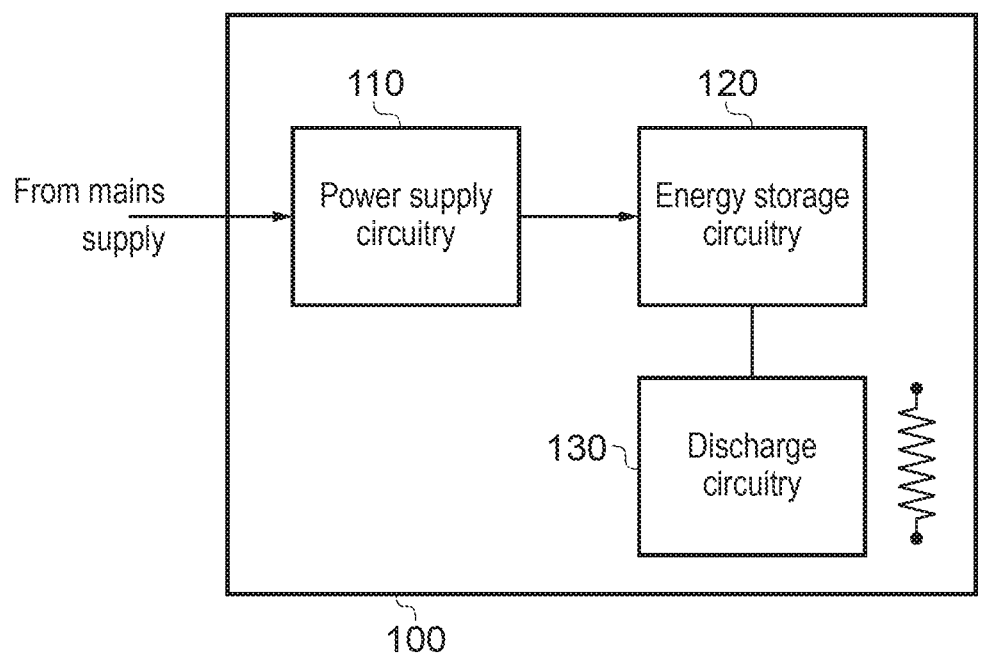
FIG. 1 is a block diagram of an apparatus in accordance with some embodiments.

Before discussing the embodiments with reference to the accompanying figures, the following description of embodiments is provided.

In accordance with one example configuration there is provided an apparatus comprising energy storage circuitry to store energy and to supply some of the energy to the apparatus; discharge circuitry to discharge the energy storage circuitry in response to the some of the energy being supplied to the apparatus; and power supply circuitry to recharge the energy storage circuitry, wherein the discharge circuitry is adapted to retain a non-zero residual energy in the energy storage circuitry when the energy storage circuitry is discharged by the discharge circuitry.

In the above example configuration, a non-zero residual energy is retained in the energy storage circuitry when being discharged by the discharge circuitry. For example, after the discharging operation has been performed by the discharge circuitry, the non-zero residual energy (e.g. an amount of energy greater than zero) will remain in the energy storage circuitry thereby reducing the amount of energy required to recharge the energy storage circuitry. As a consequence, the overall energy consumed by the apparatus is reduced as compared to a situation where no residual energy is kept in energy storage circuitry of the same capacity.

The non-zero residual energy need not be fixed. For example, in some embodiments, an amount of the non-zero residual energy is programmable. In this way, the non-zero residual energy can change over time as necessary.

In some embodiments, the apparatus comprises selection circuitry to select an amount of the non-zero residual energy from at least two values. The amount of the non-zero residual energy can thereby be programmed to one of at least two values and the discharge circuitry will then discharge the energy storage circuitry to the programmed value.

In some embodiments, the at least two values could be multiples. For example, the second value could be a multiple of the first value (e.g. double), and a third value (if present) could be a further multiple (e.g. triple) of the first value. Note that in some embodiments, the at least two values could be multiples that are powers of two of the first value. For instance, a second value could be twice the first value, and a third value could be four times the first value. By arranging the values in a binary-like fashion, it may be possible to arrive at arbitrary multiples by combining individual values together.

In some embodiments, the discharge circuitry is adapted to vary the amount of the non-zero residual energy by selectively activating or deactivating elements in the discharge circuitry. Again, by using different combinations of elements in the discharge circuitry to provide different non-zero residual values, it is possible to combine those elements to produce a wide-range of different non-zero residual values.

In some embodiments, the discharge circuitry comprises a first transistor. Transistors can be broadly categorised as being of an n-type, which more easily passes the logical value '0' than the logical value '1', or p-type, which more easily passes the logical value '1' than the logical value '0'. In some embodiments, the transistor used is a p-type. Since such transistors are less good at passing a logical value of '0', such a transistor, when connected to ground, generally tends not to full discharge to a zero voltage and instead naturally retains a voltage. When using such a transistor in the discharge circuitry, it is therefore possible to prevent a complete discharge of the energy storage circuitry and instead leave a residual charge in the energy storage circuitry.

In some embodiments, the first transistor has a natural operating voltage; and when the first transistor and other transistors are deactivated, the non-zero residual energy corresponds with the natural operating voltage. The natural operating voltage of a p-type transistor may be referred to at $V_t$. Since the p-type transistor naturally operates at this voltage, then when it is connected to ground, it will naturally retain the voltage $V_t$.

In some embodiments, the discharge circuitry comprises a second transistor of a same type as the first transistor and connected to the first transistor in series.

In some embodiments, the first transistor and the second transistor each have a natural operating voltage; and when both the first transistor and the second transistor are activated, the non-zero residual energy corresponds with twice the natural operating voltage. By providing two transistors of the same type in series (e.g. by connecting the drain of the first transistor to the gate of the second transistor) the second transistor will charge as the first transistor discharges. If the natural operating voltage of one transistor is $V_t$, then the circuit will be open (causing a discharge) provided both transistors are charged (e.g. as long as the overall voltage is about $2V_t$). Hence, the use of two transistors in this way will cause a discharge until a residual voltage of $2V_t$ is achieved.

In some embodiments, a further energy storage circuit is provided, to provide power to the apparatus while the energy storage circuitry is being discharged by the discharge circuitry. In some embodiments, the discharging of the energy storage circuitry may necessitate the energy storage circuitry being disconnected from other parts of the apparatus (in order to prevent or inhibit those parts of the apparatus being discharged too). However, this would prevent power being provided to the apparatus. Accordingly, a further energy storage circuit can be provided in order to provide power to the apparatus during these periods. The further energy storage circuit can be recharged by the power supply circuitry as the same time as the energy storage circuit or could even be recharged by the energy storage circuit itself in some embodiments.

In some embodiments, the discharge circuitry is adapted to discharge the energy storage circuitry by acting as a resistor. Such a device could, for instance, discharge energy as heat.

In some embodiments, the energy storage circuitry is a capacitor.

Particular embodiments will now be described with reference to the figures.

FIG. 1 is a block diagram of an apparatus 100 in accordance with one embodiment. The apparatus includes power supply circuitry 110, which obtains power from a mains supply. This in turn is used to provide energy to energy storage circuitry 120, which could for instance take the form of a capacitor. The energy storage circuitry is used to provide energy to the rest of the apparatus 100, although in some embodiments, the energy storage circuitry 120 could provide energy to only part of the apparatus 100. In this embodiment the energy storage circuitry takes the form of a capacitor. Discharge circuitry 130 is also provided. In this embodiment, the discharge circuitry 130 acts as a resistor and thereby discharges energy from the energy storage circuitry 120 as heat.

The discharge circuitry 130 is such that when discharging energy from the energy storage circuitry 120, a residual energy is left over. Consequently, when the power supply circuitry 110 recharges the energy storage circuitry 120, there is less work to be done and consequently, less energy is used by the system.

Figure 2:
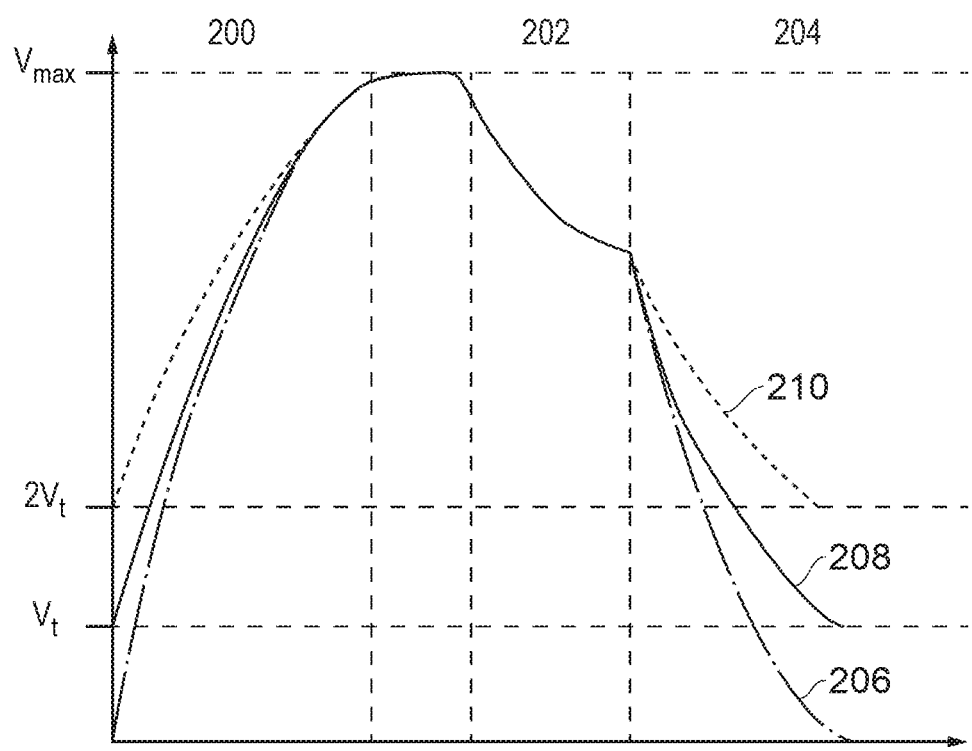
FIG. 2 shows a graph of the voltage across the energy storage circuitry over time.

FIG. 2 shows a graph of the voltage across the energy storage circuitry 120 over time. The figure shows the voltage across the energy storage circuitry 120 increasing during the recharging process 200 to $V_{max}$, at which point the energy storage circuitry 120 is fully charged. The voltage across the energy storage circuitry 120 then decreases 202 while it supplies power to the apparatus 100 (e.g. to processing circuitry within the apparatus). The voltage across energy storage circuitry 120 then decreases 204 as it is discharged by the discharge circuitry 130. A full discharge 206 by the discharge circuitry 130 is compared to a partial discharge 208 to threshold $V_t$ and a partial discharge 210 to threshold $2V_t$.

Figure 3:
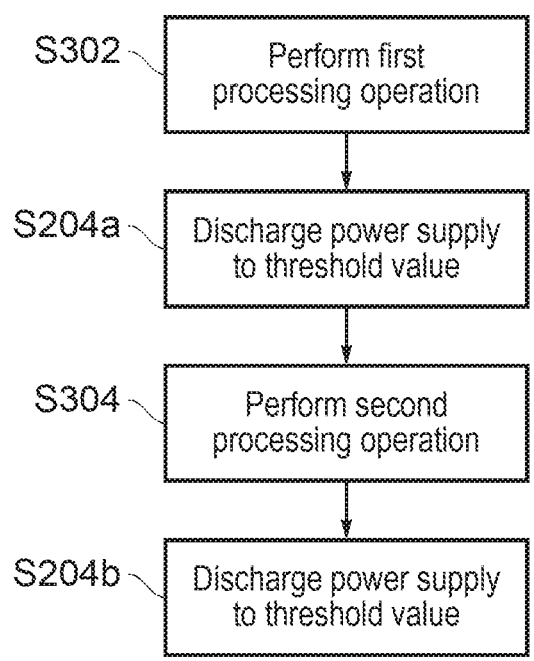
FIG. 3 illustrates a flowchart that illustrates a discharge process in accordance with some embodiments.

In the example shown in FIG. 3, the discharge circuitry 130 discharges the energy storage circuitry 120 by the same amount after different operations performed by the apparatus. In this example, it is considered that the apparatus comprises processing circuitry that performs a variety of processing operations. In S302, a processing operation is performed, and in S204a the discharge circuitry 130 partially discharges the energy storage circuitry 120 to a threshold value $V_t$. In S304, a different processing operation is performed, and in S204b, the discharge circuitry 130 discharges the energy storage circuitry 120 to the same threshold value $V_t$. Accordingly, regardless of the operation performed by the apparatus, the energy in the energy storage circuitry 120 is discharged to a non-zero residual energy $V_t$ (as heat) before being recharged. Hence, regardless of the operation performed, energy is saved as compared to a system where the energy is completed discharged from the energy storage circuitry 120.

FIG. 4A shows the voltage over time for a circuit element as it is discharged (i) and charged (ii) over an n-type transistor, and FIG. 4B shows the voltage over time for a circuit element as it is discharged (i) and charged (ii) over a p-type transistor. As shown in FIG. 4B(i), a circuit element discharged by a p-type transistor such as a p-type MOSFET (pMOS) can only be partially discharged to some threshold value $V_1$ (where $V_1$ is greater than zero but less that $V_{max}$), leaving some residual charge. A p-type transistor is therefore sufficient to partially discharge the energy storage circuitry 120, leaving some residual charge. By contrast, a circuit element discharged by an n-type transistor such as an n-type MOSFET (nMOS) can be fully discharged to zero, leaving no residual charge in the capacitor (FIG. 4A(i). Thus, when energy storage circuitry 120 is discharged over an n-type transistor, it is fully discharged to zero, and a single n-type transistor would not be sufficient to partially discharge the energy storage circuitry 120 to some threshold value. It should be noted that zero voltage is intended to mean the lowest possible voltage across that component.

Figure 6:
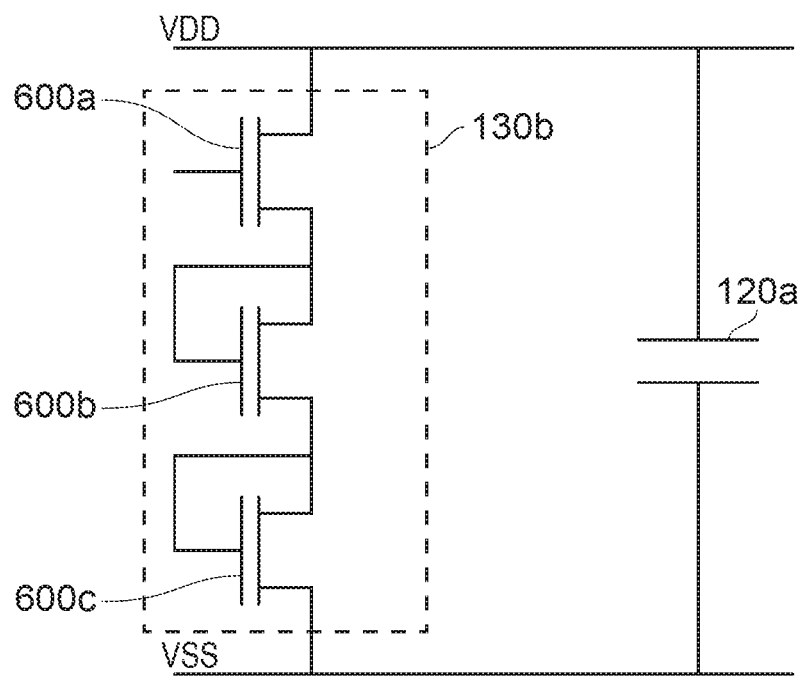
FIG. 6 shows an apparatus in accordance with some embodiments.
Figure 7:
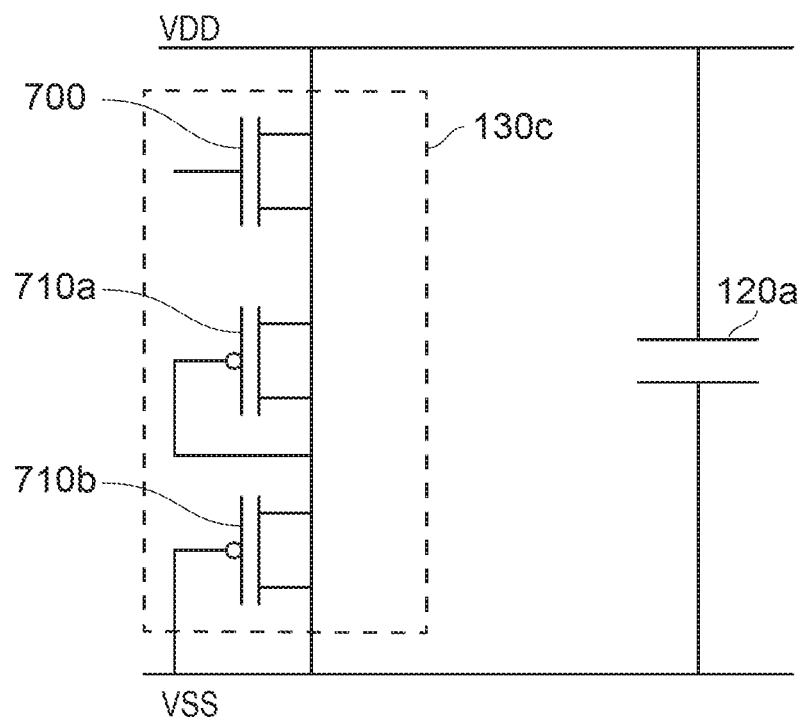
FIG. 7 shows an apparatus in accordance with some embodiments.

Conversely, when a circuit element is charged over a p-type transistor—shown in FIG. 7B(ii)—it can be fully charged to its maximum voltage $V_{max}$, whereas when charged over an n-type transistor (FIG. 4A(ii)) the circuit element can only be charged to some threshold voltage $V_2$ which is less than the maximum voltage $V_{max}$. As described in detail below with reference to FIGS. 6 and 7, this means that if an n-type transistor is provided in series with further transistors, the further transistors can be charged over the n-type transistor as the energy storage circuitry is discharged. As the further transistors will only be charged to some threshold (according to the properties of the n-type transistor in charging), this means that a residual charge is left in the energy storage circuitry, and thus the energy storage circuitry is only partially discharged.

Figure 5:
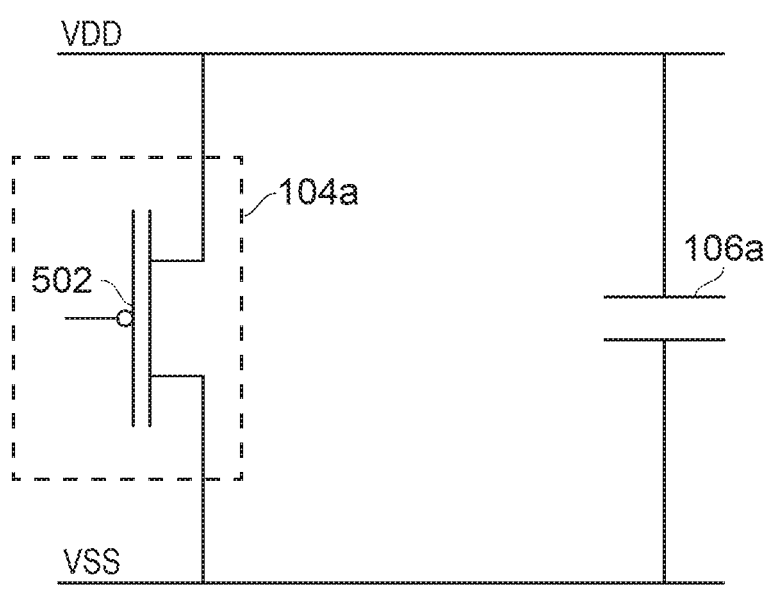
FIG. 5 shows an apparatus in accordance with some embodiments.

FIG. 5 shows an example embodiment, where the apparatus 100a comprises capacitor 120a as the energy supply circuitry 120 and discharge circuitry 130a, connected between power rails VDD and VSS. A capacitor 120a is used in this embodiment because capacitors are cheap and durable and are adapted to be quickly charged and discharged. However, it will be appreciated that the capacitor 120a can be replaced by other forms of energy storage. Discharge circuitry 130a is adapted to partially discharge capacitor 120a after an operation by the apparatus 100a (e.g. a processing operation) is complete. In this particular embodiment, discharge circuitry 130a comprises a p-type transistor 500. Due to the natural threshold of p-type transistors, capacitor 130a is only partially discharged when discharged over transistor 500, thereby leaving a residual charge in the capacitor 130a. Transistor 500 may, for example, be a pMOS transistor, that is, a p-type MOSFET transistor.

FIG. 6 shows an alternative embodiment of the present technology, in which discharge circuitry 130b comprises multiple n-type transistors 600 connected in series. The arrangement in FIG. 6 comprises a capacitor 120a and discharge circuitry 130b, connected between power rails VSS and VDD. Similarly to discharge circuitry 130a in FIG. 5, discharge circuitry 130b is adapted to partially discharge capacitor 120a to some threshold value, in this case by utilising the properties of n-type transistors. In particular, this arrangement makes use of the fact that a circuit element charged over an n-type transistor can only be charged to some threshold value $V_1$, as shown in FIG. 4A(ii). When capacitor 120a is discharged over discharge circuitry 130b, the capacitor 120a charges the first n-type transistor 600a, which in turn charges the second n-type transistor 600b, which in turn charges the third n-type transistor 600c. As transistor 600b is charged over an n-type transistor 600a, transistor 600b can only be charged to some threshold value, leaving a residual charge, which is stored in capacitor 120a. Likewise, n-type transistor 600c can also only be charged to a threshold value, due to being charged over an n-type transistor 600b, leaving a further residual charge stored in capacitor 120a. The capacitor 120a is therefore left with a residual charge from both transistors. In practice, the residual charge provided by the two transistors will be the same thereby providing a multiple of the residual charge contributed by one transistor on the capacitor 120a. The threshold voltage (and the residual charge) for capacitor 120a can be increased by adding more n-type transistors 600 in series, and it will therefore be appreciated that the number of n-type transistors 600 in the discharge circuitry 130b is not limited to three, but can be any number greater than one.

FIG. 7 shows a further embodiment of the present technology, in which discharge circuitry 130c comprises an n-type transistor 700 and p-type transistors 710 connected in series. This arrangement utilises both the properties of n-type transistors in charging shown in FIG. 7A(ii) and the properties of p-type transistors in discharging shown in FIG. 7B(i). In FIG. 7, when the capacitor 120a is discharged over the discharge circuitry 130c, the capacitor 120a first charges the n-type transistor 700, which charges a first p-type transistor 710a, which in turn charges a second p-type transistor 710b. As the first p-type transistor 710a is charged over n-type transistor 700, it can only be charged to some threshold value $V_2$, and thus a residual charge remains in the system. Then, as the first p-type transistor 710a discharges over the second p-type transistor 710b, it can only be discharged to a threshold, leaving a further residual charge of the same amount. Thus, a "double" residual charge of is left in capacitor 120a. As in the previous embodiment, the threshold value to which capacitor 120a is discharged can be increased by adding more n-type transistors, and it can also be increased by adding more p-type transistors. Thus it will be appreciated that the embodiment shown in FIG. 7 is not limited to one n-type transistor 700 and two p-type transistors 710 as shown, but any number of n-type and p-type transistors can be used.

FIGS. 5, 6 and 7 show various configurations of discharge circuitry 130 according to the present technology, however it will be appreciated that any arrangement of the discharge circuitry 130 that allows the energy storage circuitry 120 to be partially discharged can be used. In general, this may be a single p-type transistor as in FIG. 5, multiple transistors of one or both of p-type and n-type, or any other configuration that would give the same result.

Some embodiments of the present technique include power rails VDD and VSS. Power rails VDD and VSS are arranged to have a voltage between them. The discharge circuitry 130 and the energy storage circuitry 120 are connected between the power rails, as shown in FIGS. 5-7, such that the power rails VDD and VSS supply charge between the energy storage circuitry 120 and the discharge circuitry 130.

In some embodiments, the threshold value to which the energy storage circuitry 120 is discharged is the same each time the energy storage circuitry 120 is discharged. In other embodiments, the threshold value may be variable. In any of FIGS. 5-7, a fixed threshold can be used, however the arrangements in FIGS. 6 and 7 can also be configured to provide a variable threshold, where the threshold can be decreased by bypassing one or more of the transistors in the discharge circuitry 130. If the threshold value for a given transistor is $V_t$, then each additional transistor included in series increases the threshold by $V_t$. FIG. 2 shows examples of thresholds like this. For example, an apparatus comprising a single p-type transistor 208 has a threshold of $V_t$ whereas an apparatus comprising two p-type transistors in series 210 has a threshold of $2V_t$.

Figure 8:
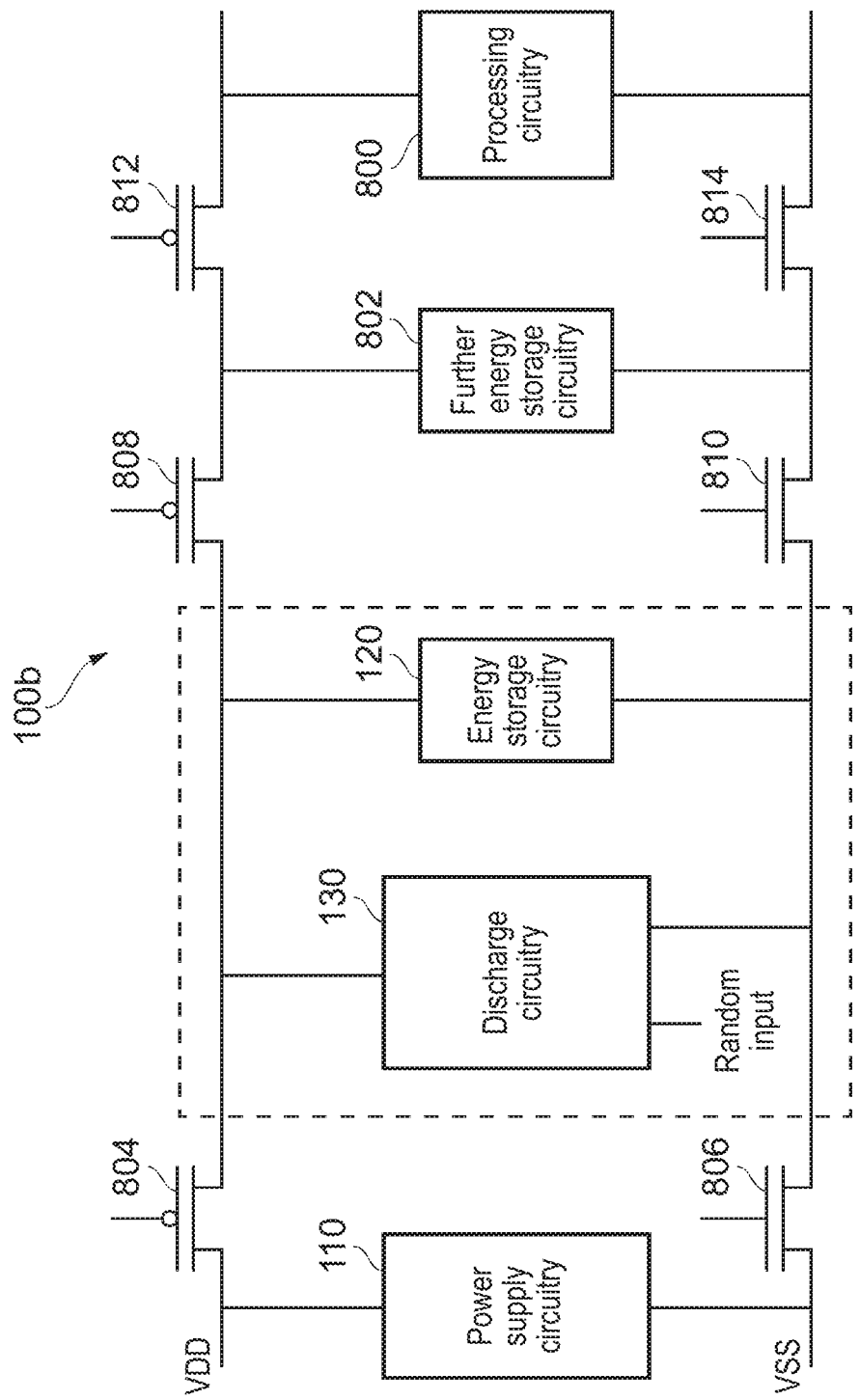
FIG. 8 shows an apparatus in accordance with some embodiments.

FIG. 8 shows an embodiment of the present technique, in which the apparatus 100b includes power supply circuitry 110, energy storage circuitry 120, and discharge circuitry 130 configured to partially discharge energy storage circuitry 120. The apparatus includes processing circuitry 800 for performing processing operations.

The energy storage circuitry 120, discharge circuitry 130 and processing circuitry 800 are all connected between power rails VDD and VSS, which supply power from power supply circuitry 110 to the energy storage circuitry 120 in order to recharge it, and also connect the energy storage circuitry 120 to the processing circuitry 800 such that the energy storage circuitry 120 can supply power to the processing circuitry 800, as well as connecting the energy storage circuitry 120 to the discharge circuitry 130 such that the energy storage circuitry 120 can be discharged across the discharge circuitry 130. Power rail VSS defines zero voltage for the system. The apparatus 100b also includes a further energy storage circuitry 802 connected between power rails VDD and VSS, arranged such as to supply power to the processing circuitry 802 while energy storage circuitry 120 is being recharged or discharged. FIG. 8 also shows six transistors configured to act as switches, including refresh transistors 804 and 806, transfer transistors 808 and 810, and energy storage transistors 812 and 814. The transistors 804-814 are interchangeably referred to here as switches. The transistors 804-814 may be MOSFETs, however it will be appreciated that any other power switches can be used in place of transistors 804-814, or any other components configured to regulate the flow of electricity in the circuit.

Figure 9:
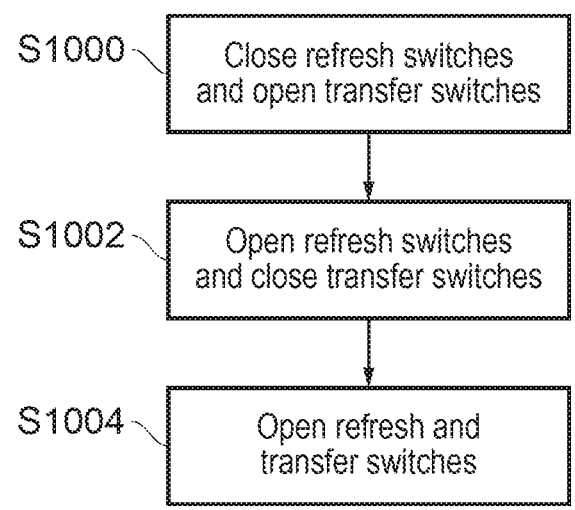
FIG. 9 illustrates a flow diagram that shows how the apparatus of FIG. 8 can be operated, in accordance with some embodiments.

FIG. 9 shows is a flow diagram showing a method by which the apparatus 100b of FIG. 8 can be operated. Switches 804, 806, 808, 810, 812 and 814 allow the processes of charging the further storage circuitry 802, providing power to the processing circuitry 800, discharging the energy storage circuitry 120 or charging the energy storage circuitry 120 to be isolated from one another. For example, allowing the further energy storage circuitry 802 to be charged without the energy storage circuitry 120 being discharged. In S1000, refresh switches 804 and 806 are closed and transfer switches 808 and 810 are left open. This allows the energy storage circuitry 120 to be charged. Once the energy storage circuitry 120 is fully charged, in S1002 both refresh switches 804 and 806 are opened and transfer switches 808 and 810 are closed. This allows energy storage circuitry 120 to charge the further energy storage circuitry 802 until the two power supplies reach equilibrium. Alternatively, if further energy storage circuitry 802 is not present, the energy storage circuitry 120 can be configured to supply power directly to processing circuitry 800. The processing circuitry 800 carries out some processing operation, after which—or after the energy storage circuits 120 and 802 have reached equilibrium—in S1004, the transfer switches 808 and 810 are opened, allowing energy storage circuitry 120 to be partially discharged across the discharge circuitry 130, while further energy storage circuitry 802 is arranged to supply power to the processing circuitry 800 by closing both power supply switches 812 and 814. As refresh switches 804 and 806 and transfer switches 808 and 810 are all open, the discharging of the energy storage circuitry 120 takes place over the discharge circuitry 130. The discharge circuitry 130 discharges the energy storage circuitry 120 by acting as a resistor, converting electrical power stored in the energy storage circuitry 120 to heat, which is dissipated within the apparatus 100b.

Figure 10A:
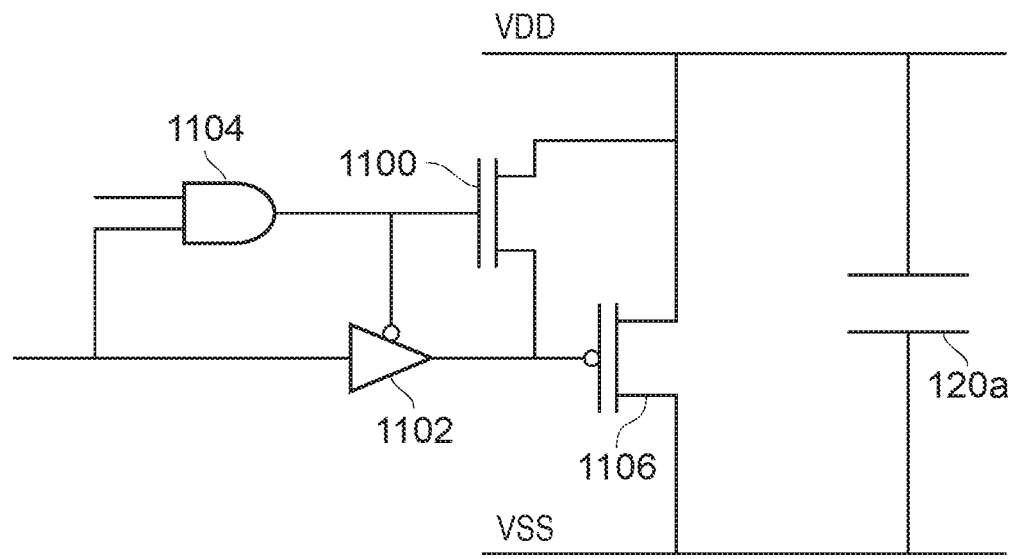
FIGS. 10A, 10B, 11A, and 11B show programmable embodiments of the present technique.
Figure 10B:
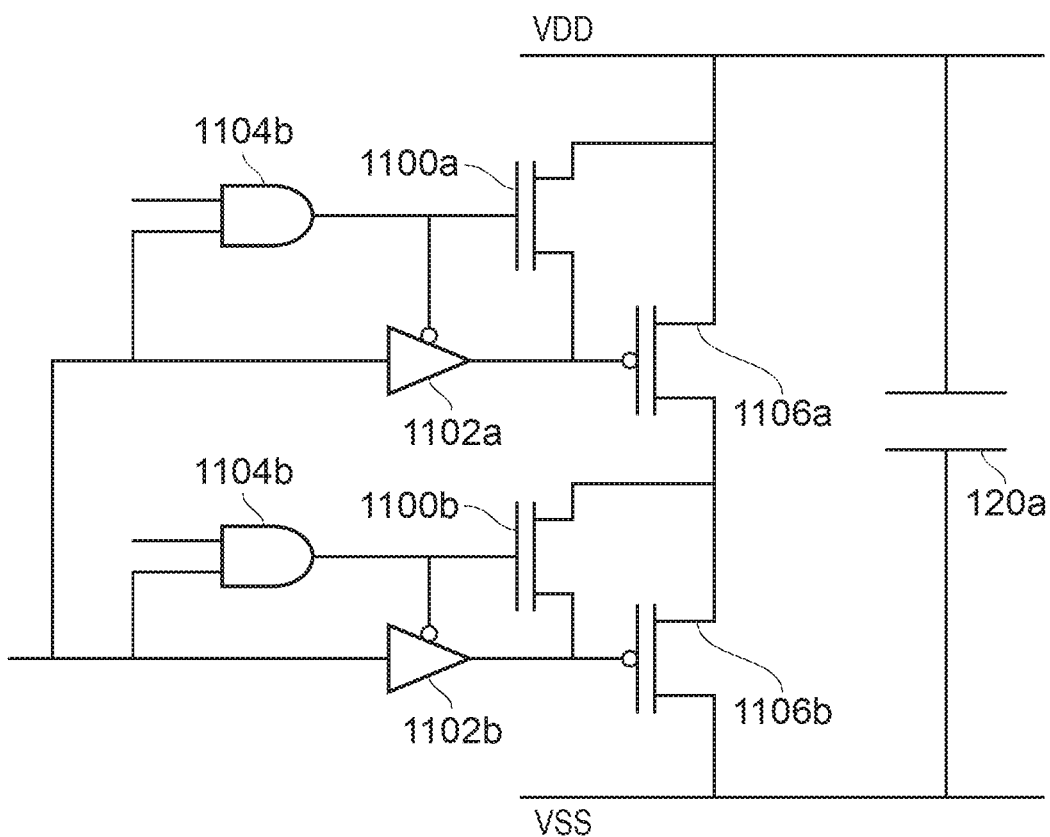

FIGS. 10-11 show embodiments of the present technique that are programmable, that is they can be controlled using program logic. FIG. 10A shows an example of how AND an gate 1104 and a buffer 1102 can be arranged along with transistor 1100 such that they can be used to activate or deactivate a transistor 1106. FIG. 10B shows how this design can be extended to multiple transistors 1106. This allows the threshold value to which the capacitor 120a is discharged to be varied by selectively activating or deactivating transistors 1106. The arrangement in FIG. 10 is known as an "active low" configuration.

Figure 11A:
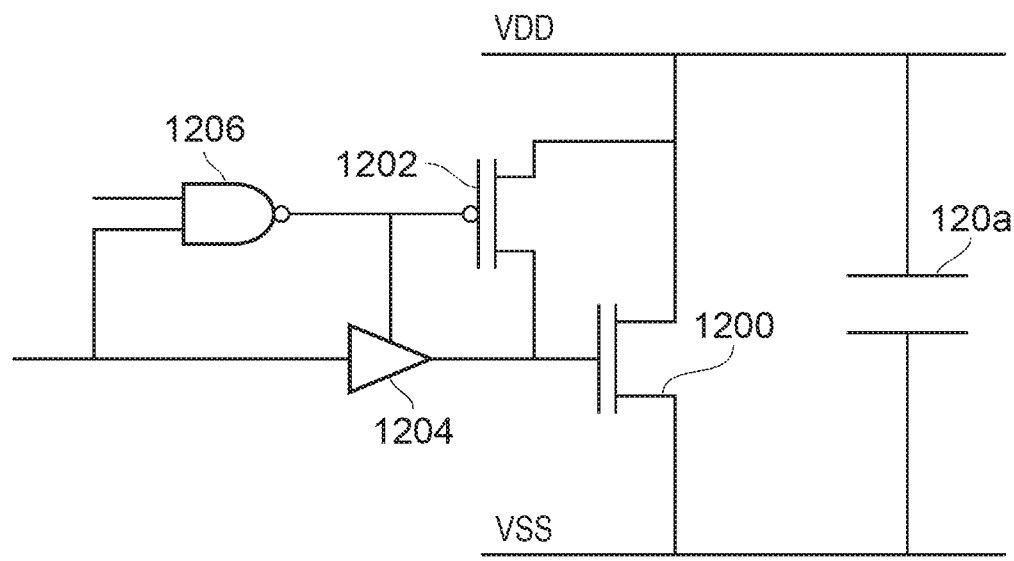
Figure 11B:
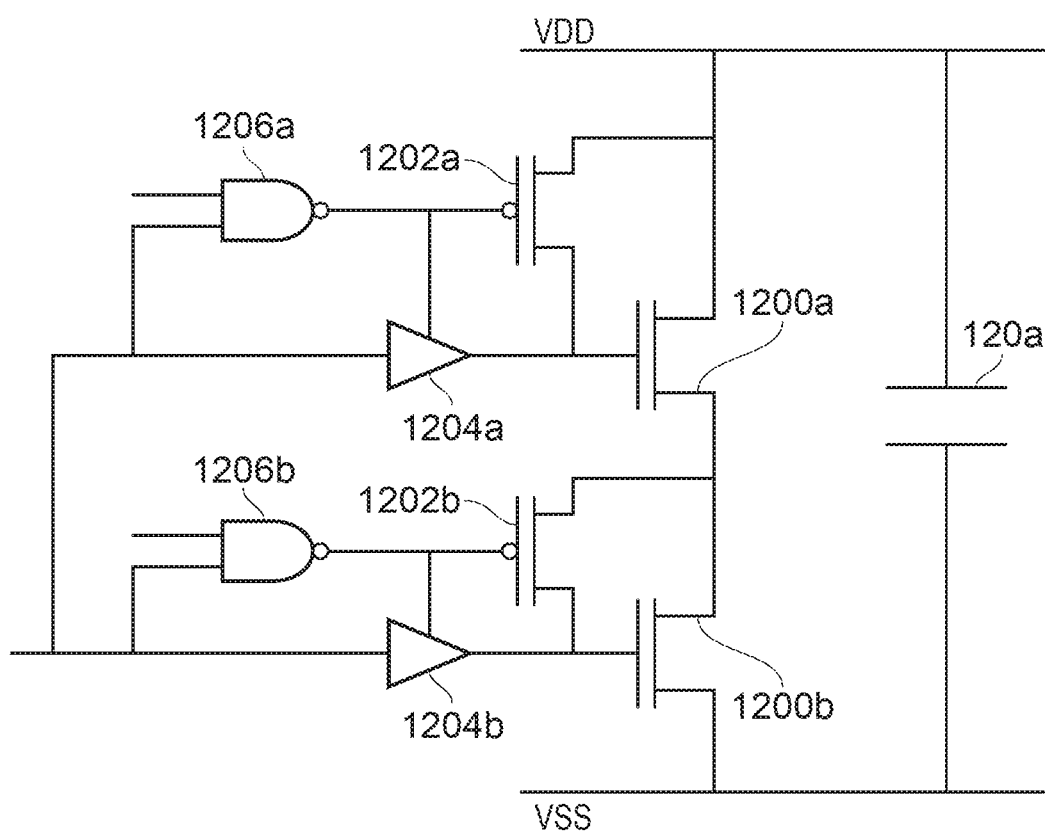

FIG. 11 shows an "active high" configuration of a programmable embodiment of the present technique. FIG. 11A shows a buffer 1204, a transistor 1202 and an AND gate 1206 configured to activate or deactivate a transistor 1200 based on inputs to the AND gate 1206. FIG. 11B shows how this configuration can be extended to multiple transistors 1200.

It will be appreciated that although FIGS. 10B and 11B only show two transistors in series, configured to be selectively activated or deactivated, this arrangement could be extended to any number of transistors 1106/1200.

FIGS. 10-11 show how the threshold value for the capacitor 120a can be varied. The threshold value can hence be selected from a number of values, each multiples, dependent on how many transistors 1106/1200 are activated. There are numerous ways in which the threshold value can be chosen, for example the threshold value may be chosen at random. This further improves the security of the system by removing any predictability from the power consumption of the system. The threshold value may be chosen at random based on some random input, for example a random number may be generated and a number of transistors equalling that number may be activated. It will be appreciated that there are many ways of making a random choice of the threshold value, and any method may be used. Furthermore, it will be appreciated that it is often not practical to make a truly random choice, so it will be appreciated that "random" in the context of this application is intended to also mean a selection made in a pseudo-random manner.

The programmable embodiments of the present technique depicted in FIGS. 10-11 can also be controlled by a computer program comprising program instructions.

Figure 12:
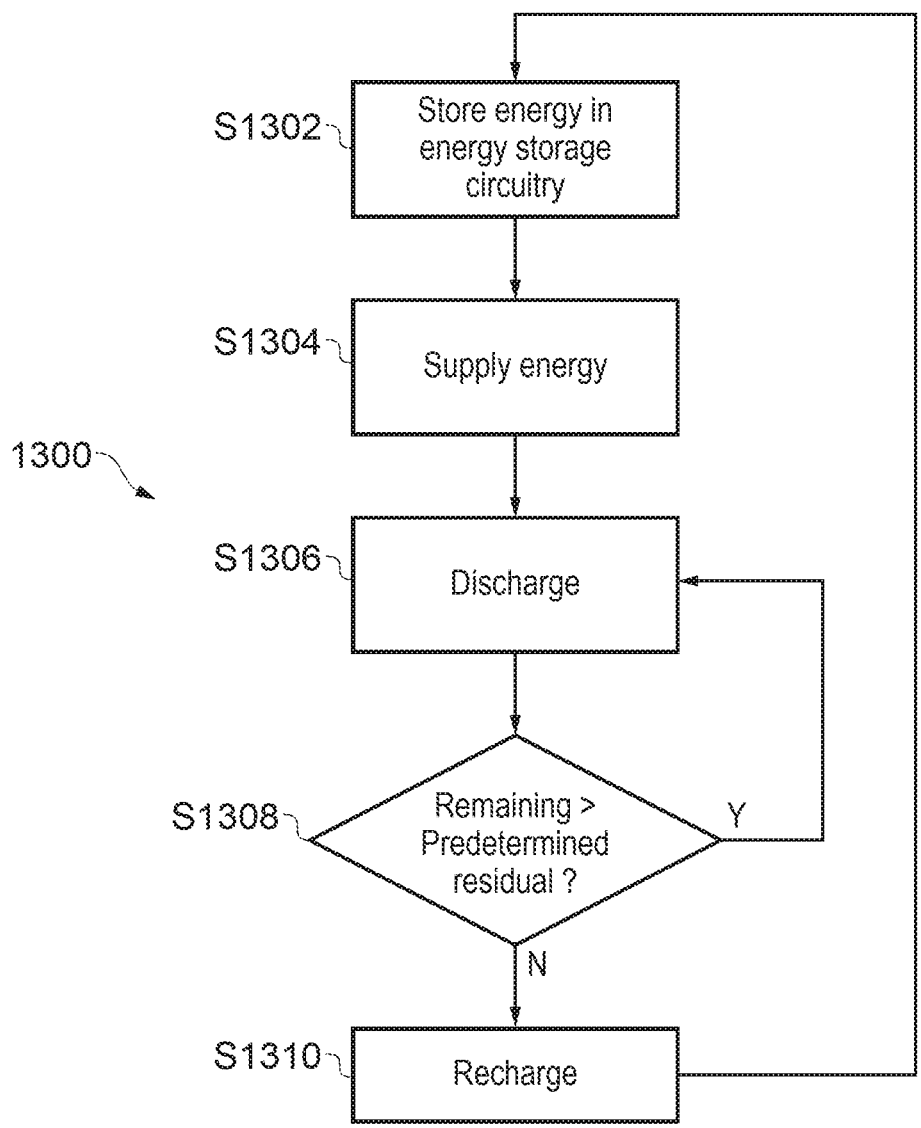
FIG. 12 is of a flow diagram that illustrates some embodiments of the present technique.

FIG. 12 is of a flowchart 1300 that illustrates an embodiment of the present invention. At a step S1302, energy is stored in the energy storage circuitry 120. At a step S1304, energy is supplied from the energy storage circuitry to the apparatus 100, for example to a processing circuit 802 within an apparatus 100b. With this operation complete, the energy storage circuitry 120 is discharged at a step S1306. This continues (via step S1308) until the remaining energy reaches a predetermined preset value (the preset value, e.g. a positive integer multiple of $V_t$). Once this has been completed, the energy storage circuitry 120 is recharged, e.g. by power supply circuitry 110. By maintaining a residual charge at the energy storage circuitry 120, the energy required to recharge the energy storage circuitry 120 by the power supply circuitry 110 can be reduced.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An apparatus comprising:
energy storage circuitry to store energy and to discharge some of the energy to supply the some of the energy to a processing circuit;

discharge circuitry to further discharge the energy storage circuitry in response to the some of the energy being discharged to the processing circuit;

power supply circuitry to recharge the energy storage circuitry, wherein the discharge circuitry is adapted to retain the non-zero residual energy in the energy storage circuitry when the energy storage circuitry is further discharged by the discharge circuitry during the supply of the some of the energy to the processing circuit;

the discharge circuitry comprises a first transistor;

the first transistor is a p-type transistor;

the first transistor has a natural threshold operating voltage; and when the first transistor and other transistors are deactivated, the non-zero residual energy corresponds with the natural threshold operating voltage.

2. The apparatus according to claim 1, wherein an amount of the non-zero residual energy is programmable.

3. The apparatus according to claim 1, wherein the discharge circuitry comprises a second transistor of a same type as the first transistor and connected to the first transistor in series.

4. The apparatus according to claim 3, wherein the first transistor and the second transistor each have a natural threshold operating voltage; and when both the first transistor and the second transistor are activated, the non-zero residual energy corresponds with twice a natural threshold operating voltage for one of the first and second transistors.

5. The apparatus according to claim 1, wherein a further energy storage circuit is provided, to provide power to the apparatus while the energy storage circuitry is being further discharged by the discharge circuitry.

6. The apparatus according to claim 1, wherein the discharge circuitry is adapted to further discharge the energy storage circuitry by acting as a resistor.

7. The apparatus according to claim 1, wherein the energy storage circuitry is a capacitor.

8. The apparatus according to claim 1, wherein neither of the at least two values is a unitary value.

9. The apparatus according to claim 1, further comprising selection circuitry to select an amount of a non-zero residual energy from at least two values.

10. The apparatus according to claim 9, wherein the at least two values are multiples.

11. The apparatus according to claim 9, wherein the discharge circuitry is adapted to vary the amount of the non-zero residual energy by selectively activating or deactivating elements in the discharge circuitry.

12. A method comprising:

storing energy in energy storage circuitry;

discharging, using a p-type transistor, some of the energy from an energy storage circuitry to supply the some of the energy to a processing circuit;

further discharging the energy storage circuitry in response to the some of the energy being supplied to the processing circuit;

retaining a non-zero residual energy in the energy storage circuitry during the further discharging; and recharging the energy storage circuitry, wherein the p-type transistor has a natural threshold operating voltage; and when the first transistor and other transistors are deactivated, the non-zero residual energy corresponds with the natural threshold operating voltage.

* * * * *